Feb. 14, 1933.     G. W. WILDIN     1,897,780
FRICTION SHOCK ABSORBING MECHANISM
Filed July 9, 1929     2 Sheets-Sheet 1
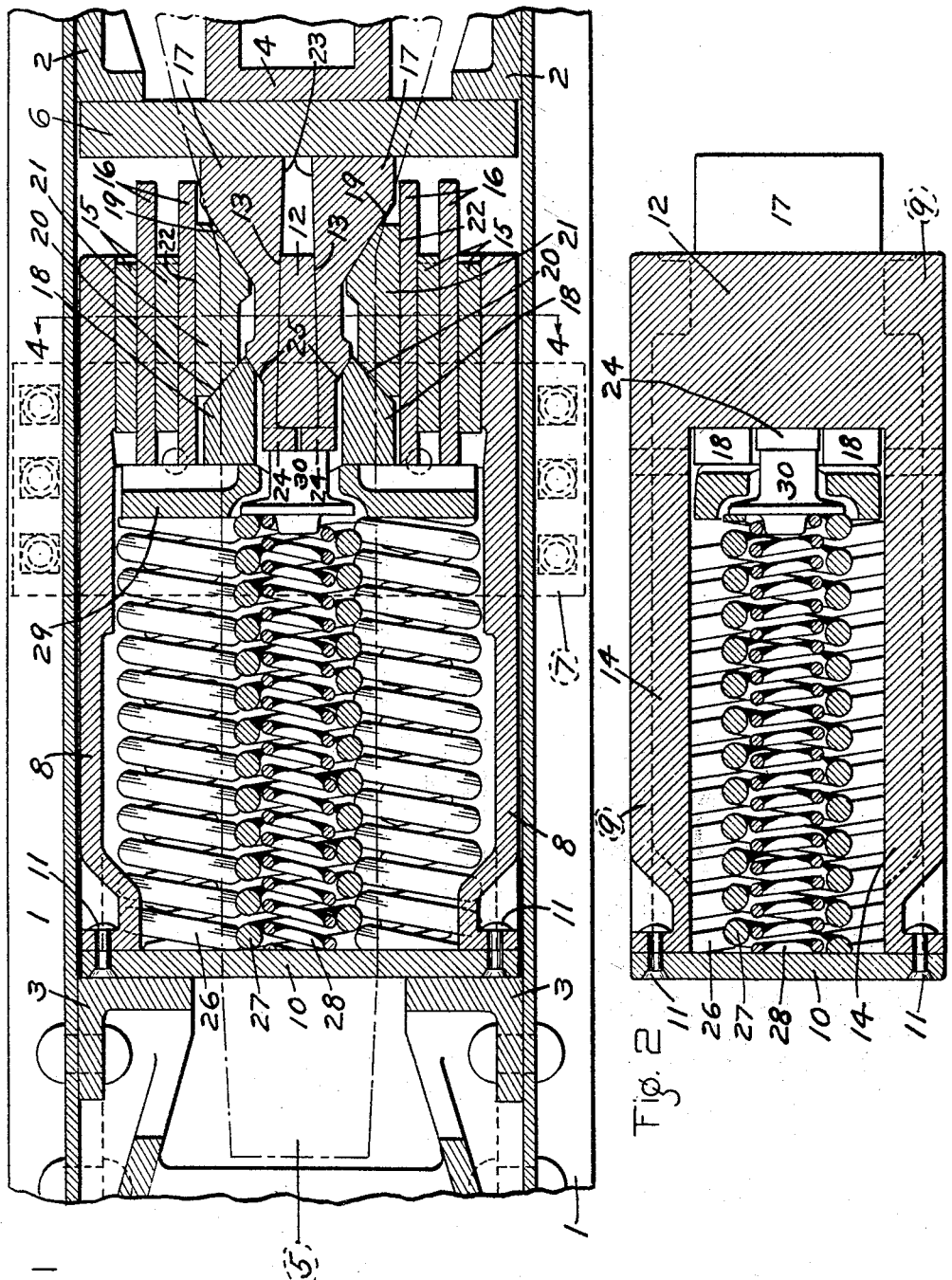
INVENTOR
GEORGE W. WILDIN
BY *Wm. M. Cady*
ATTORNEY Feb. 14, 1933.    G. W. WILDIN    1,897,780
FRICTION SHOCK ABSORBING MECHANISM
Filed July 9, 1929    2 Sheets-Sheet 2
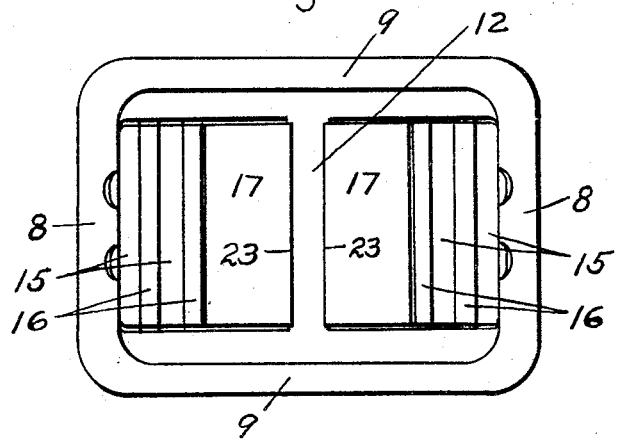
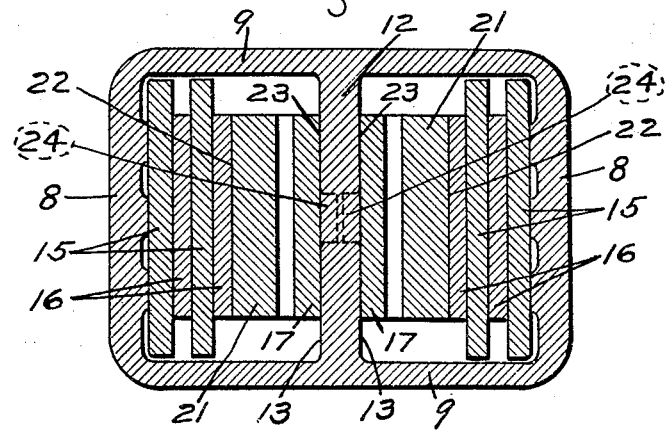
INVENTOR
GEORGE W. WILDIN
BY
ATTORNEY Patented Feb. 14, 1933

1,897,780

UNITED STATES PATENT OFFICE

GEORGE W. WILDIN, OF PITTSBURGH, PENNSYLVANIA, ASSIGNOR, BY MESNE ASSIGN-
MENTS, TO CARDWELL WESTINGHOUSE COMPANY, OF CHICAGO, ILLINOIS, A CORPO-
RATION OF DELAWARE

FRICTION SHOCK ABSORBING MECHANISM

Application filed July 9, 1929. Serial No. 377,012.

This invention relates to improvements in friction shock absorbing mechanisms of the type especially adapted for use in draft riggings for railway rolling stock and particularly to that type comprising a casing containing spring resisted friction means.

An object of my invention is to provide a friction shock absorbing mechanism of the above type having a casing in which the forward end portion thereof is provided with a centrally arranged, integral web or strut which extends between and connects two of the opposite walls thereof and divides the forward end of the casing laterally into two friction element receiving compartments.

Another object of my invention is to provide a friction shock absorbing mechanism having two groups of friction elements arranged side by side in the forward end portion of the casing and to provide a strut integrally connecting two opposite walls of the casing and separating the two groups of friction elements from each other.

A further object of my invention resides in the novel means I employ for maintaining two separated pressure creating wedge blocks, of a friction shock absorbing mechanism, assembled with the casing of the mechanism.

A still further object of my invention is to provide a friction shock absorbing mechanism in which there are two groups of friction elements arranged side by side in the casing separated by a web or strut integral with the casing and in which the friction elements of both groups may be inserted and removed through the forward end of the casing, and further, in which one of the friction elements of each group of elements is adapted to interlock with the strut to maintain the element assembled with the casing.

Other objects and advantages will appear in the following more detailed description of the invention.

In the accompanying drawings; Figure 1 is a horizontal longitudinal sectional view of my improved friction shock absorbing mechanism embodied in a railway draft rigging; Fig. 2 is a vertical longitudinal sectional view of my friction shock absorbing mechanism; Fig. 3 is an end elevational view of the same and Fig. 4 is a cross sectional view through the shock absorbing mechanism at the place indicated by the line 4—4 in Fig. 1.

In the drawings, the reference character 1 indicates the usual center or draft sills of a railway car underframe, to the webs of which sills, are secured front stop lugs 2 and rear stop lugs 3.

The reference character 4 indicates the inner end of a drawbar, to which, is operatively connected, the usual draft yoke 5.

Disposed within the yoke 5, is my improved shock absorbing mechanism and a front follower 6, all of which, are supported, by a plate 7, detachably carried by the sills 1, in such a manner that the sides of the follower plate engage the front stop lugs 2 and the rear end portion of the mechanism engages the rear stop lugs 3.

My improved friction shock absorbing mechanism may comprise a hollow rectangular casing having side walls 8, top and bottom walls 9 and a rear end wall 10, which end wall, in the present embodiment of the invention, is separate from walls 8 and 9, and is detachably secured thereto by rivets 11 or any other desired means.

The forward end of the casing is open and, according to my invention, is divided into two compartments by a web or strut 12, which is centrally arranged between the side walls 8 and integrally connects the top and bottom walls 9. This strut extends longitudinally for some distance rearwardly of the forward end of the casing, and throughout its length, is wedge shaped, having friction surfaces 13 on opposite sides, which diverge rearwardly from the forward end of the strut. Extending inwardly from and integral with, the top and bottom walls 9, are longitudinally disposed strengthening ribs 14 which are integrally connected to the rear end of the strut 12.

Contained in each of the compartments formed in the forward end of the casing, is a group of alternated friction plates 15 and 16 which are disposed at one side of a wedging mechanism also contained in each compartment, the plates 15 being anchored to the casing and the plates 16 being movable relative to the plates 15 under buffing and pulling impacts.

The wedging mechanism contained in each compartment of the casing, comprises longitudinally disposed wedge blocks 17 and 18 having wedging faces 19 and 20, respectively, adapted to engage corresponding wedging faces of a wedge block or shoe 21 disposed at one side of the wedge blocks 17 and 18, said shoe 21 having a friction face 22 in frictional engagement with the movable plate 16 located nearest the longitudinal center line of the mechanism. The face 20 slopes in the opposite direction to the face 19 but preferably at the same angle.

Each wedge block 17 has a friction face 23 which engages one of the friction faces 13 of the strut 12. Each wedge block, at its rear or inner end is provided with a laterally extending stop lug or flange 24 which overlaps and is adapted to engage the rear or inner end of the strut 12 of the casing and, by virtue of this engagement, outward movement of the wedge block relative to the casing is limited and the wedge block is held assembled with the casing.

Each wedge block 17, intermediate its ends, is further provided with a wedging face 25 which slopes rearwardly toward the longitudinal center line of the mechanism, and frictionally engages a corresponding wedging face on the rear wedge block 18. In the present embodiment of the invention, the friction faces 19 and 25 slope in the same direction with each other and at the same angle.

Also contained in the casing are springs 26, 27 and 28, the rear ends of which seat against the rear wall 10 of the casing. The movable plates 16 and wedge blocks 18 are subject to the pressure of the springs 26, through the medium of a spring plate 29, which is interposed between the outer ends of the springs and the inner ends of the movable plates and wedge block.

The wedge blocks 17 are subject to the pressure of the springs 27 and 28 through the medium of a follower member 30 interposed between the outer ends of the springs and the flanges 24 of the wedge blocks, the forward end of the follower member extending through an opening in the spring plate 29 and engaging the flanges 24.

In operation, under buffing forces, the wedge blocks 17 are moved rearwardly against the resistance of the springs 27 and 28 and also the resistance of the springs 26, due to the engagement of the wedge blocks 17 with the wedge blocks 18, and as the wedge blocks 17 are thus moved, they are caused to move laterally, due to the cooperation of the friction faces 23 with the friction faces 13 of the strut 12. Due to this longitudinal and transverse movement of the wedge blocks 17, the wedge shoes 21 are moved longitudinally against the pressure of the springs 26 acting through the spring plate 29 and wedge blocks 18. Due to the cooperation of the friction wedge faces 19 and 20 of the wedge blocks 17 and 18 respectively, with corresponding friction wedge faces on the wedge shoes 21, the moving of the wedge blocks 17 both longitudinally and transversely relative to the casing and the resistance offered by the wedge block 18, cause the wedge shoes 21 to exert lateral pressure on the friction plates 15 and 16 and on the sides of the casing. The outer ends of the movable plates 16 are next engaged by the follower plate 6 and are moved thereby with the wedge blocks 17. Continued rearward movement of the wedge blocks 17 and the increasing resistance offered by the wedge blocks, due to the compression of the springs 26, cause the lateral pressure of the wedge shoes 21 on the friction plates to increase.

In the present embodiment of the invention the slopes of the cooperating friction faces of the wedging mechanism are such, that when the wedge blocks 17 are subjected to buffing and pulling impacts, there will be no lateral movement imparted to the wedge blocks 18. It will be understood however, that, by changing the degree of slope of the faces 25 and the corresponding faces on the wedge blocks 18 that transverse movement may be imparted to the wedge blocks 18. Should these wedge blocks 18 be caused to move laterally, the resistance of the mechanism would be increased due to the sliding engagement of the wedge blocks with the spring plate 29.

Due to the transverse movement of the wedge blocks 17 there will be additional frictional resistance set up between the follower 6 and the wedge blocks.

By making the strut 12 wedge shaped so as to impart lateral movement to the wedge blocks 17, sufficient pressure may be created by the wedging mechanism, that the plates 15 and 16 may have parallel friction surfaces and may be so disposed in the casing that their friction surfaces will be parallel with the longitudinal center line of the mechanism and with the inner surfaces of side walls at the forward end of the casing instead of sloping the plates relative to the longitudinal center line of the mechanism as is customary in some friction shock absorbing mechanisms of the friction plate type. When the friction plates are thus sloped, the outer ends of the movable plates move laterally relative to the follower 6 under service impacts so that in time grooves are worn in the follower which to some extent impairs the proper operation of the mechanism. With a friction shock absorbing mechanism constructed in accordance with my invention, there will be no transverse movement of the movable plates 16 relative to the follower 6, consequently there will be no chafing of the follower by the plates 16.

When the compressive force on the mechanism is relieved, the pressure of the springs 27 and 28, which have been compressed, operates to effect the release of the wedge blocks 17 and the pressure of the springs 26 acts, through the medium of the spring plate 29, to return the movable friction plates 16 to their normal release positions. The pressure of the spings 26 acting through the spring plate 29 and wedge blocks 18, also assists in returning the wedge blocks 17 to their release positions. Due to the engagement of the wedge blocks 18 with the sloping faces 25 of the wedge blocks 17, the pressure of the springs 26 tend to maintain the friction faces 23 in close contact with the friction faces 13 of the strut 12, thus assisting in the proper release of the mechanism.

When the mechanism is fully released, the flanges 24 on the wedge blocks 17 engage the rear end of the strut 12 and stop further relative movement between the wedge blocks and casing, thus holding the wedge blocks assembled with the casing.

In assembling the friction shock absorbing mechanism, the spring plate 29, follower member 30 and springs 26, 27 and 28 are inserted in the casing, in the order named, through the open rear end thereof, after which, the bottom 10 is secured in place. The springs are now temporarily compressed by pressure applied to the spring plate 29, and are held so compressed by temporary holding pins which may be inserted through the openings 31 in the casing, into engagement with the spring plate 29. The stationary plates 15, wedge blocks 18 and wedge shoes 21 are next inserted through the open forward end of the casing on either side of the strut 12. Now the wedge blocks 17 are inserted through the open forward end of the casing and disposed one on each side of the strut 12, and lastly, the movable plates 16 are inserted. Upon the insertion of the plates 16, the wedge shoes 21, wedge blocks 18 and wedge blocks 17 will be moved transversely of the casing toward the longitudinal center line of the mechanism, until the friction faces 23, of the wedge blocks 17, are in contact with the friction faces 13 of the strut 12, in which positions, the flanges 24 of the wedge blocks 17 are in positions to engage with the rear end of the strut 12. The temporary holding pins are now removed permitting the pressure of the springs to operate the mechanism to its normal release position.

Should any of the friction elements become damaged it will be apparent that they may be readily removed and replaced through the open forward end of the casing. In the case of such removal or replacement of any part or parts, the necessary preliminary operation is to temporarily compress the springs.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

In a friction shock absorbing mechanism, the combination with a casing, of a strut having friction faces and tapering toward its outer end, the strut being integral with the casing and dividing the forward end thereof into two compartments, a group of friction elements in each compartment, each group comprising a wedge block engaging said strut, a wedge block engaged by the first mentioned wedge block, a wedge shoe cooperating with both of said wedge blocks, friction plates interposed between and engaging said wedge shoe and casing, said wedge blocks, wedge shoe and strut cooperating to exert lateral pressure on said plates, and spring means resisting movement of both groups of friction elements.

In testimony whereof I have hereunto set my hand, this 5th day of July, 1929.

GEORGE W. WILDIN.